United States Patent [19]

Kawamura et al.

[11] 4,425,062
[45] Jan. 10, 1984

[54] CUTTING AND CHAMFERING APPARATUS FOR OPPOSING ENDS OF TUBULAR MATERIAL

[75] Inventors: Teruaki Kawamura, Shimonoseki; Tadashi Nishimura, Kitakyushu; Kazuo Akagi; Ryujiro Shitamatsu, both of Shimonoseki, all of Japan

[73] Assignee: Kabushiki Kaisha Kobe Seiko Sho, Kobe, Japan

[21] Appl. No.: 302,124

[22] Filed: Sep. 14, 1981

[30] Foreign Application Priority Data

Nov. 6, 1980 [JP] Japan .................................. 55-157336

[51] Int. Cl.[3] .................... B23B 51/08; B23B 39/22; B27C 9/00; B23G 1/20
[52] U.S. Cl. .................................. 408/28; 29/33 T; 408/40; 408/56; 408/67; 409/137
[58] Field of Search ............ 408/33, 40, 41, 44, 408/50, 52, 56, 61, 67, 68, 69, 70; 409/137, 138, 159, 172, 180, 203; 29/33 T, 417

[56] References Cited

U.S. PATENT DOCUMENTS

| | | | |
|---|---|---|---|
| 1,800,779 | 4/1931 | Clark | 29/417 |
| 2,015,685 | 10/1935 | Martin | 408/41 |
| 2,633,039 | 3/1953 | Baney et al. | 408/40 |
| 2,728,253 | 12/1955 | Gettig | 408/70 |
| 2,923,952 | 2/1960 | Sawdey | 408/44 |
| 3,851,991 | 12/1974 | Walker | 408/40 |
| 4,011,792 | 3/1977 | Davis | 408/61 |

Primary Examiner—E. R. Kazenske
Assistant Examiner—Paul M. Heyrana, Sr.
Attorney, Agent, or Firm—Oblon, Fisher, Spivak, McClelland & Maier

[57] ABSTRACT

A cutting and chamfering apparatus for opposite ends of a tubular member including a cutting and chamfering support for holding horizontally the member, two tables provided respectively at opposite ends of the support, and a cutting machine and chamfering machine mounted in combination on each of the tables.

12 Claims, 12 Drawing Figures

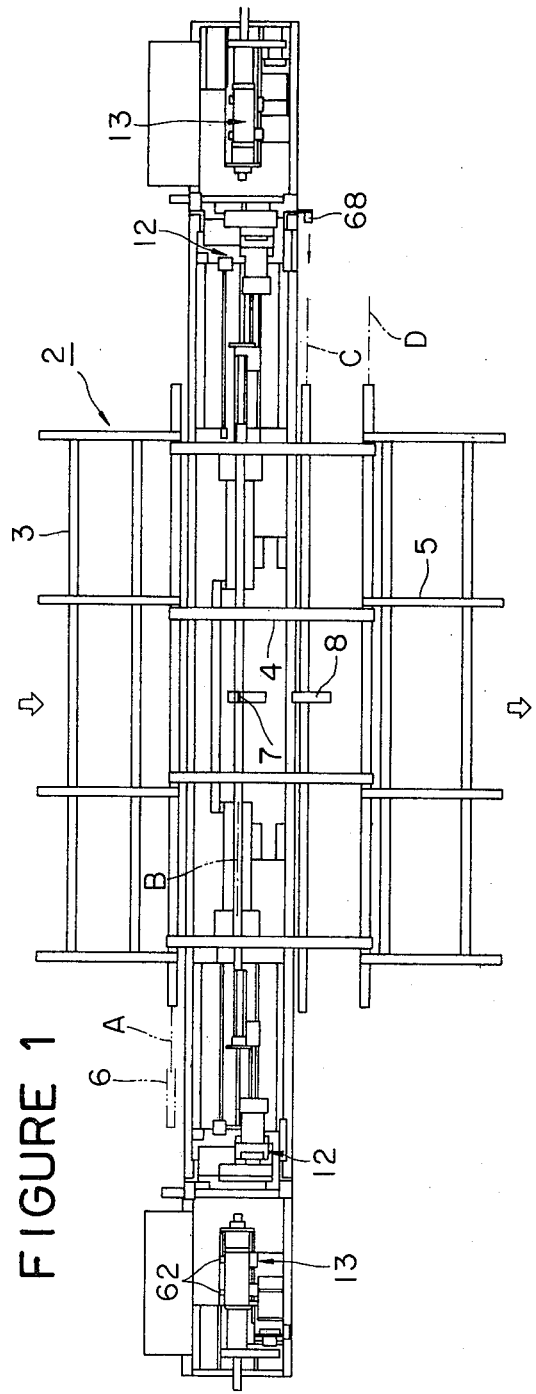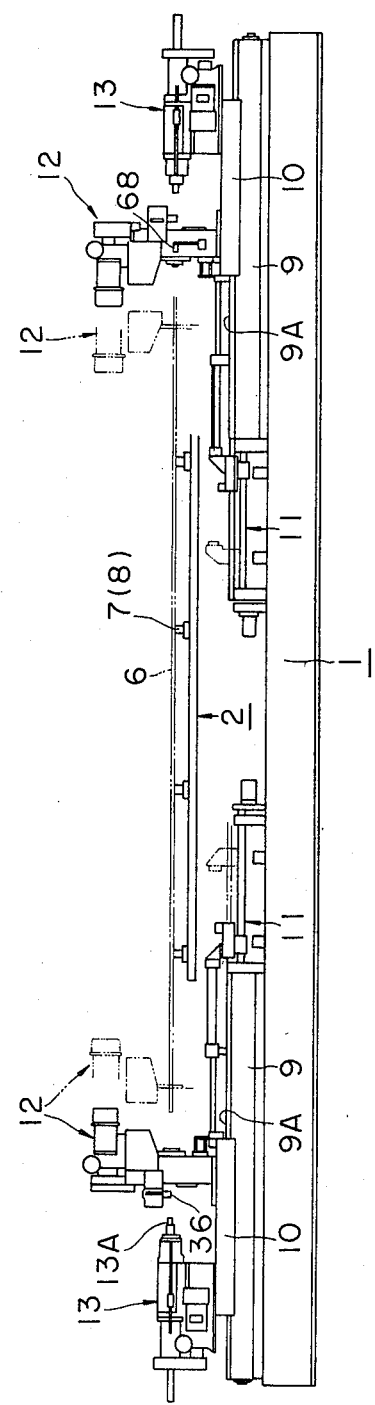

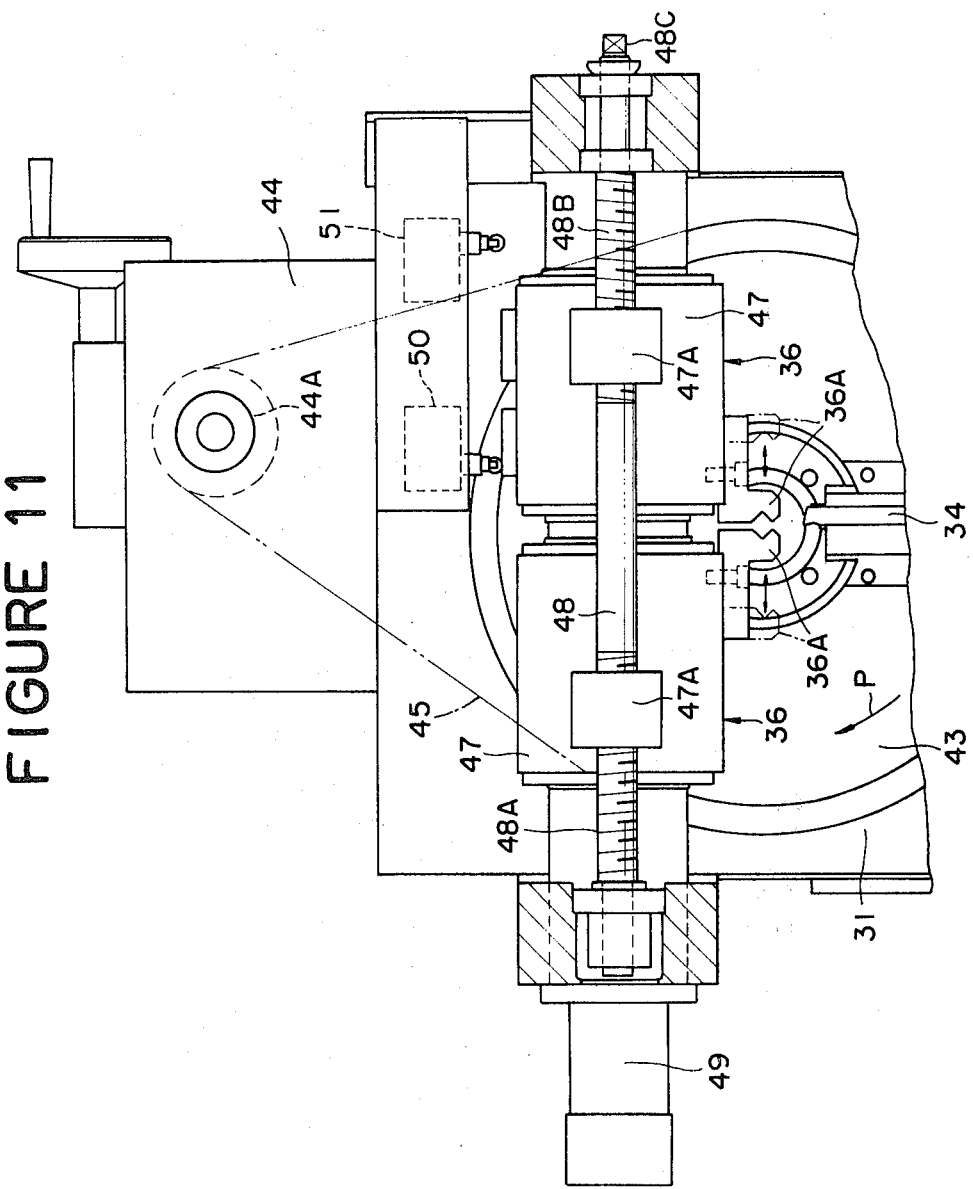

CUTTING AND CHAMFERING APPARATUS FOR OPPOSING ENDS OF TUBULAR MATERIAL

BACKGROUND OF THE INVENTION

1. Field of the Invention

This invention relates to a cutting and chamfering apparatus for opposing ends of a tubular member, and, more particularly, to an apparatus for cutting opposite ends of a tubular member precisely and promptly without producing scratches on the tubular member and chamfering the thus-cut end faces. This invention also relates to such an apparatus as mentioned above, which improves the yield of tubular members while promptly and completely removing chips or the like remaining in the tubular member.

2. Description of the Prior Art

It has been known to produce tubular members of zirconium, zirconium alloy or stainless steel with a mirror-finished surface free of any pits, ruggedness or uneveness by polishing both inner and outer surfaces of each tubular members after annealing and subjecting the tubular member to required treatment steps such as pickling treatment and rinsing treatment. In the final state of the production of such tubular members, a longer tubular member is cut a predetermined length and the thus-cut end faces are subjected to chamfering, followed by a final inspection step.

Upon carrying out the cutting work of both ends of the tubular member and subsequent chamfering work of the end faces in the final stage, if any damage has been unfortunately produced somewhere along the length of the tubular member, it is necessary to cut off an end portion containing the damaged portion. However, damage does not occur at any specific spot but tends to occur at scattered locations. Thus, if a tube end cutting machine is fixed with respect to the lengthwise direction of tubular member, the tubular member loaded on the cutting machine would be cut at a fixed place and many of the thus-cut tubular members would be found defective due to inclusion of one or more damaged portions, thereby resulting in a very poor production yield.

On the other hand, it is indispensable to hold a tubular material while cutting both end portions of the tubular member and chamfering the thus-cut end faces. It is especially required that this holding would not produce any scratches where the tubular member is made of zirconium or a zirconium alloy and requires very severe product quality.

Furthermore, the equipment is required to perform both cutting and chamfering work on tubular members of different lengths while meeting the desire for quickness of operation and strict maintenance of the quality which are mutually exclusive.

SUMMARY OF THE INVENTION

The object of this invention is to provide an apparatus which satisfactorily meets the above-mentioned requirements. This invention thus provides a cutting and chamfering apparatus for opposing ends of a tubular member including a cutting and chamfering support for holding the tubular member in a horizontal position, two tables provided respectively at opposite ends of the support, the tables being displaceable back and forth relative to each other independently or simultaneously in the direction of the longitudinal axis of the tubular member, and a cutting machine and chamfering machine mounted in combination on each of the tables for cutting its corresponding end portion of the tubular member and chamfering an end face to be formed by the cutting machine. The apparatus also includes a main chuck and an auxiliary chuck provided with each cutting machine with an interval in the lengthwise direction of the tubular member on line of extension of the longitudinal axis of the tubular member supported on the support and adapted to releasably hold the tubular member, a cutting tool provided with each cutting machine at a position between the main chuck and auxiliary chuck in such a manner that the cutting tool can be advanced toward or retracted from the longitudinal axis of the tubular member, so as to cut off the end portion of the tubular member and a chamfering tool provided with each chamfering machine in such a manner that the chamfering tool can be advanced or retracted relative to the end face of the tubular member cut by the cutting tool and rotated on the longitudinal axis of the tubular member.

The cutting and chamfering apparatus may further include a cleaning support for holding the tubular member in the horizontal position at a location at a discharge side of the cutting and chamfering support, and a fluid nozzle provided near either one of the cut and chamfered ends of the tubular member so as to jet out a fluid through the fluid nozzle into and through the tubular member and remove any chips from the tubular member. The fluid nozzle is preferably attached to either one of the cutting machines.

The cutting and chamfering apparatus according to this invention is particularly useful as a final cutting and chamfering apparatus for tubular member made of zirconium or a zirconium alloy. However, it should be understood that it can also be employed as an intermediate cutting and chamfering apparatus for tubular members made of zirconium or a zirconium alloy or a final or intermediate cutting and chamfering apparatus for tubular members of stainless steel or other metals.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a plan view illustrating the outline of a cutting and chamfering apparatus for opposite ends of a tubular member made of zirconium or a zirconium alloy embodying this invention, the apparatus being employed prior to the final, i.e., inspection step;

FIG. 2 is a front elevational of the apparatus;

FIG. 11 is a partial frontal view principally illustrating in detail an auxiliary chuck.

DETAILED DESCRIPTION OF THE PREFERRED EMBODIMENT

Figure 3:
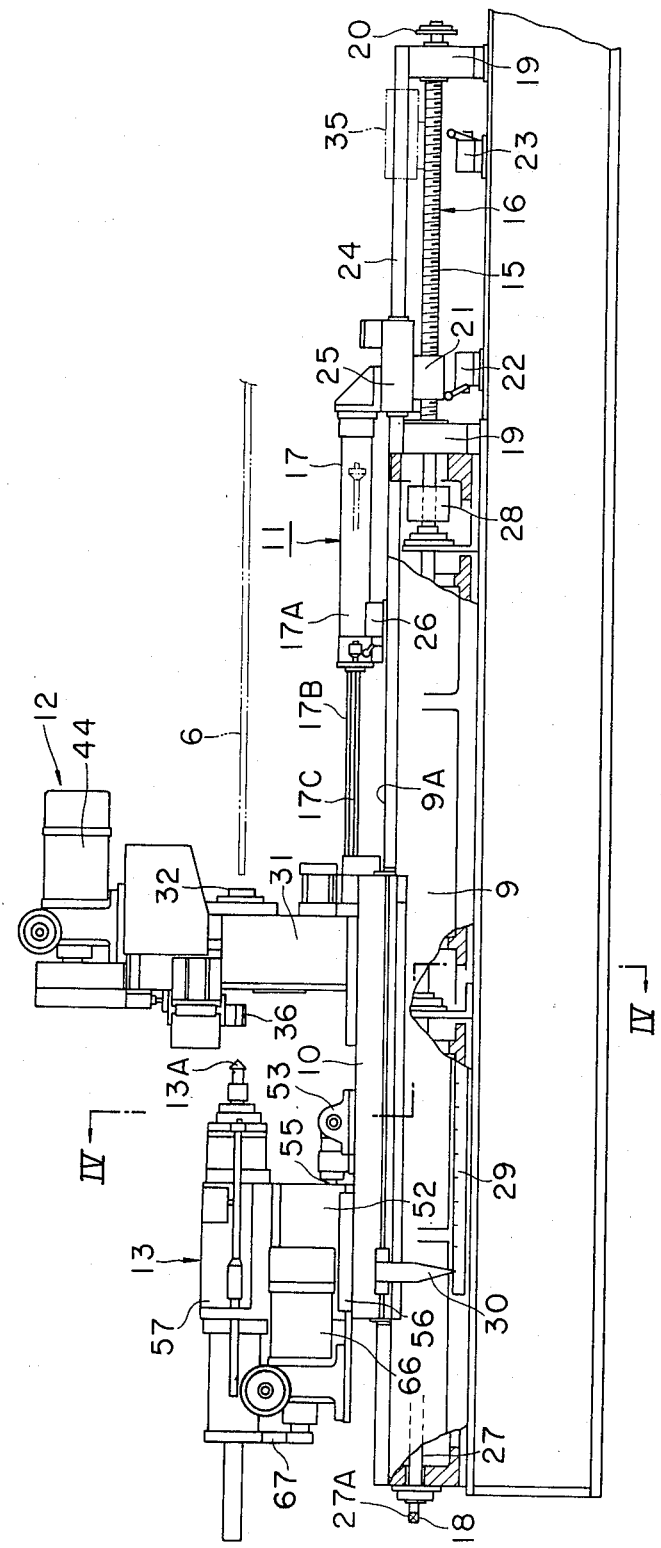
FIG. 3 is a partially cut-away front elevational view of the leftside unit of the apparatus.
Figure 4:
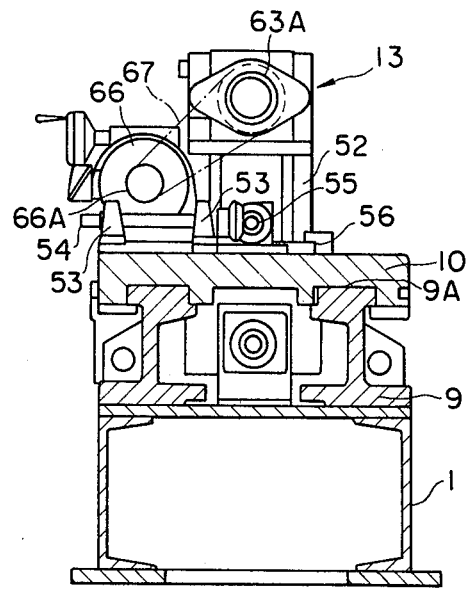
FIG. 4 is a cross-sectional view taken along line IV—VI of FIG. 3.
Figure 8:
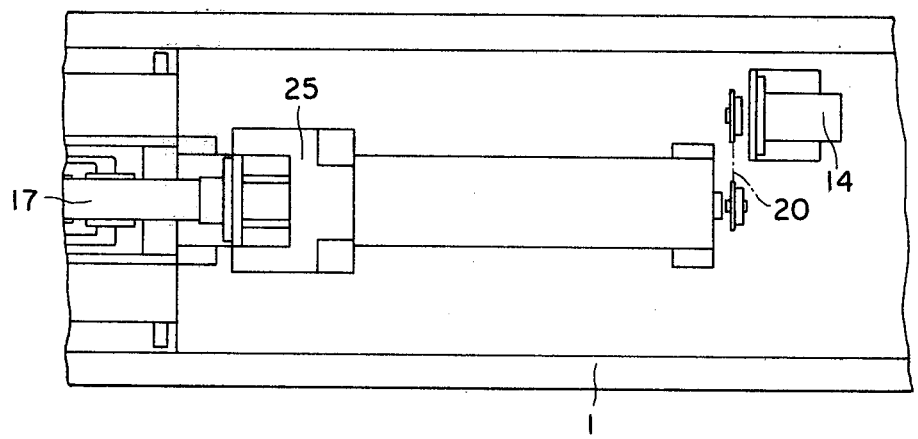
FIG. 6 through FIG. 8 are plan views showing various parts in FIG. 3.
Figure 5:
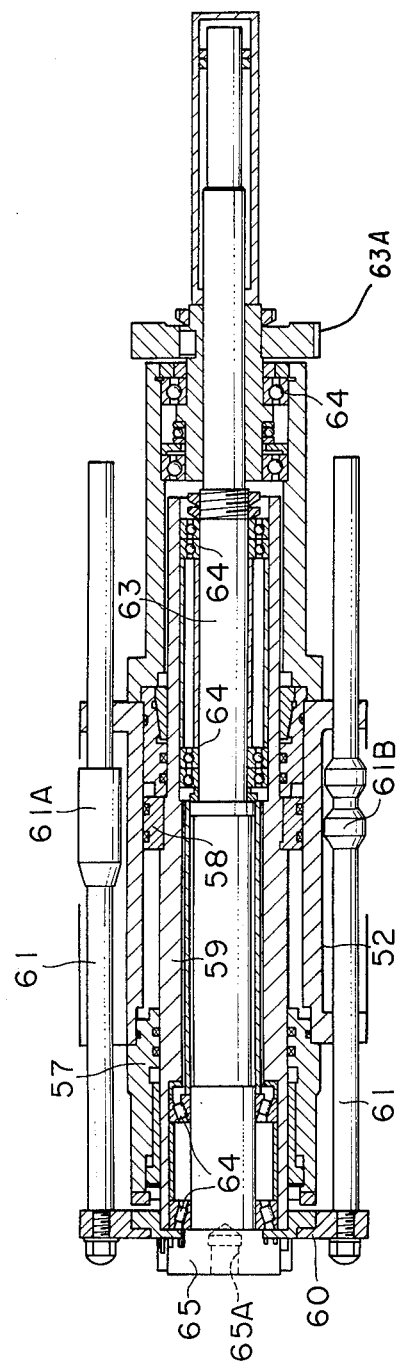
FIG. 5 is a cross-sectional view showing the driving portion of a chamfering machine.
Figure 6:
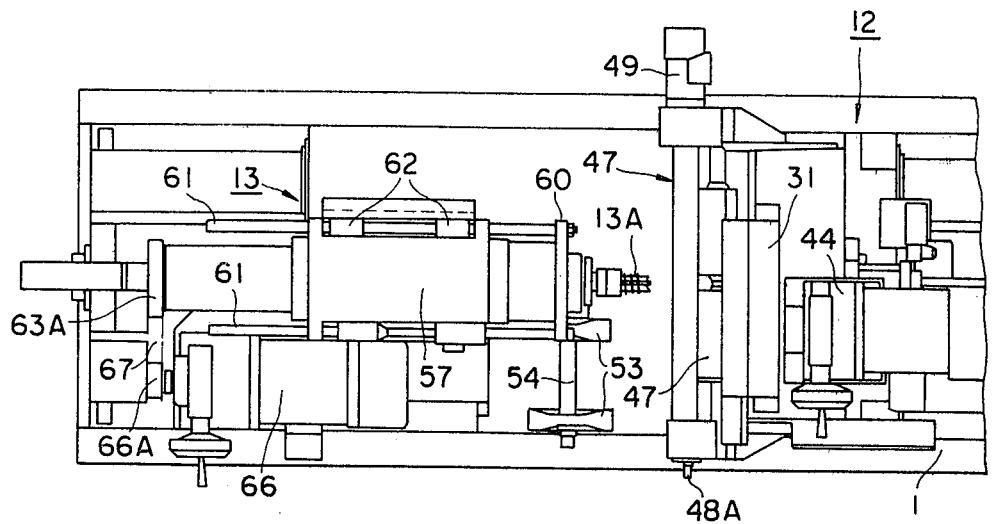
Figure 7:
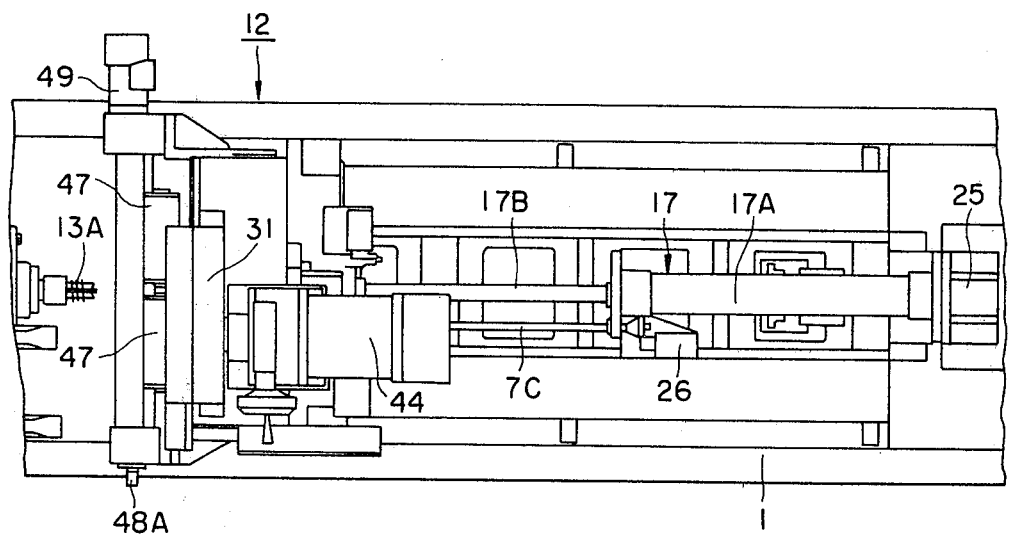

Referring first to FIGS. 1 and 2, reference numeral 1 indicates a support frame, and designated by numeral 2 is a table unit which includes a feed-in table 3, a cutting and chamfering table 4 and a discharge-side table 5. Table unit 2 is located centrally with respect to the length of the support frame 1.

Feed-in table 3 is capable of supporting in horizontal position a number (for example, 50) of tubular members 6 which have been passed through pickling and rinsing treatments. Cutting and chamfering table 4 can receive one of the tubular members 6 on the feed-in table 3 at a second station B, which is located at the longitudinal center of the table 4, from a first station A by means of a parallel motion mechanism (not illustrated). Furthermore, the tubular member 6 can be conveyed from the second station B to a third station C and fourth station D on the discharge-side table 5, through similar parallel motion mechanisms. In the illustrated embodiment, supports 7 are provided at intervals along the length of the second station B so as to support tubular member 6 on the second station B of the cutting and chamfering table 4. Other supports 8 of the same structure are provided on the third station C so as to transport tubular members (final products) placed side by side on the discharge-side table 5 to the next inspection step (not shown).

At each side of the supports 7 (practically speaking, at each side of the support frame 1) there is fixedly mounted a table support 9 having a sliding guide surface 9A. A table 10 is provided on each of the table supports 9 in engagement with the corresponding sliding guide surface 9A. Both tables 10 are displaceable back and forth relative to each other independently or simultaneously by means of their respective table driving devices 11.

In addition, on each table 10, there are provided side by side a cutting machine 12 equipped with a cutting element for an end portion of the tubular member 6 supported on the supports 7 and a chuck element adapted to chuck the tubular member upon cutting the same as well as a chamfering machine 13 equipped with a chamfering element to chamfer the thus-cut end face. The pair of the right and left cutting machines 12 and chamfering machines 13 are identical on both sides except for the provision of a fluid nozzle which will be described hereinafter.

Referring principally to FIGS. 3, 4 and 6–8, table driving device 11 will be described. The table driving device 11 includes a driving device 16 including a hydraulic motor 14 and screw shaft 15 to allow the table 10 to fit with tubular members of varied lengths, another driving device including a fluid cylinder device 17 for setting the cutting and chamfering lengths of the tubular member, and a fine adjustment driving device 18 of a manually operated handle. First of all, the driving device 16 is constructed by fixedly providing bearings 19 with an interval therebetween, extending the screw shaft 15 between the bearings 19, reversibly transmitting the driving force of the hydraulic motor 14 to the screw shaft 15 through a wrapping connector 20, threadedly fitting a threaded cylinder 21 on the screw shaft 15 and connecting the threaded cylinder 21 and table 10 by the fluid cylinder device 17. When the hydraulic motor 14 is driven while fixedly holding (i.e., hydraulically locking) the fluid cylinder device 17, the table 10 is reciprocally displaced along the sliding guide surface 9A of the table support 9 owing to the cooperation of the threads on the screw shaft 15 with the thread in the threaded cylinder 21. Moreover, on the support frame 1 are preferably provided switches 22, 23 which are turned on or off by the threaded cylinder 21 on the support frame 1 for setting sensing positions of minimum and maximum lengths. It is also desirable to extend a slide guide bar 24 between the bearings 19 and to slidably fit on the slide guide bar 24 a cylinder-supporting cylinder 25 which is practically integral with the threaded cylinder 21.

Fluid cylinder device 17 is of a telescopic type and is constructed of a tube 17A, a piston rod 17B hermetically fit in the tube 17A, and a guide rod 17C axially displaceable with respect to the relative position of the table 10 and the proximal end of the tube 17A. In the illustrated embodiment, the tube 17A is fixed on the supporting cylinder 25 and the free end of the piston rod 17B is connected with the table 10. Here it is desirable to detect the position of the piston rod 17B by providing a switch 26.

Fine adjustment driving device 18 is formed by connecting a connecting rod 27 disposed in the table support 9 with the screw shaft 15 through a coupling 28 and providing a tool-attachment part 27A at the free end of the connecting rod 27. Fine adjustment can be performed by mounting a tool (handle) on the tool-attachment part 27A and rotating the rod 27 about its longitudinal axis.

In the present embodiment, a graduated plate 29 is attached on an upright side wall of the table support 9 and an indicator 30 is provided on the table 10, thereby enabling confirmation of the length of the tubular member 6 to be cut. Next, the construction of the cutting machine 12 per se mounted upright on the table 10 will be described, mainly, with reference to FIGS. 3, 6, 7, and 9–12.

Designated by reference numeral 31 is a cutting machine housing in which there are disposed a main chuck 32, a chuck driving 33 permitting the main chuck 32 to hold or release a tubular material by virtue of fluid pressure, and a driving device 35 for a cutting tool 34 provided on an outer side part of the housing 31. There is also provided outside the housing 31 an auxiliary chuck 36 provided so as to be spaced in the lengthwise direction of the tubular member from the above mentioned main chuck 32.

Figure 9:
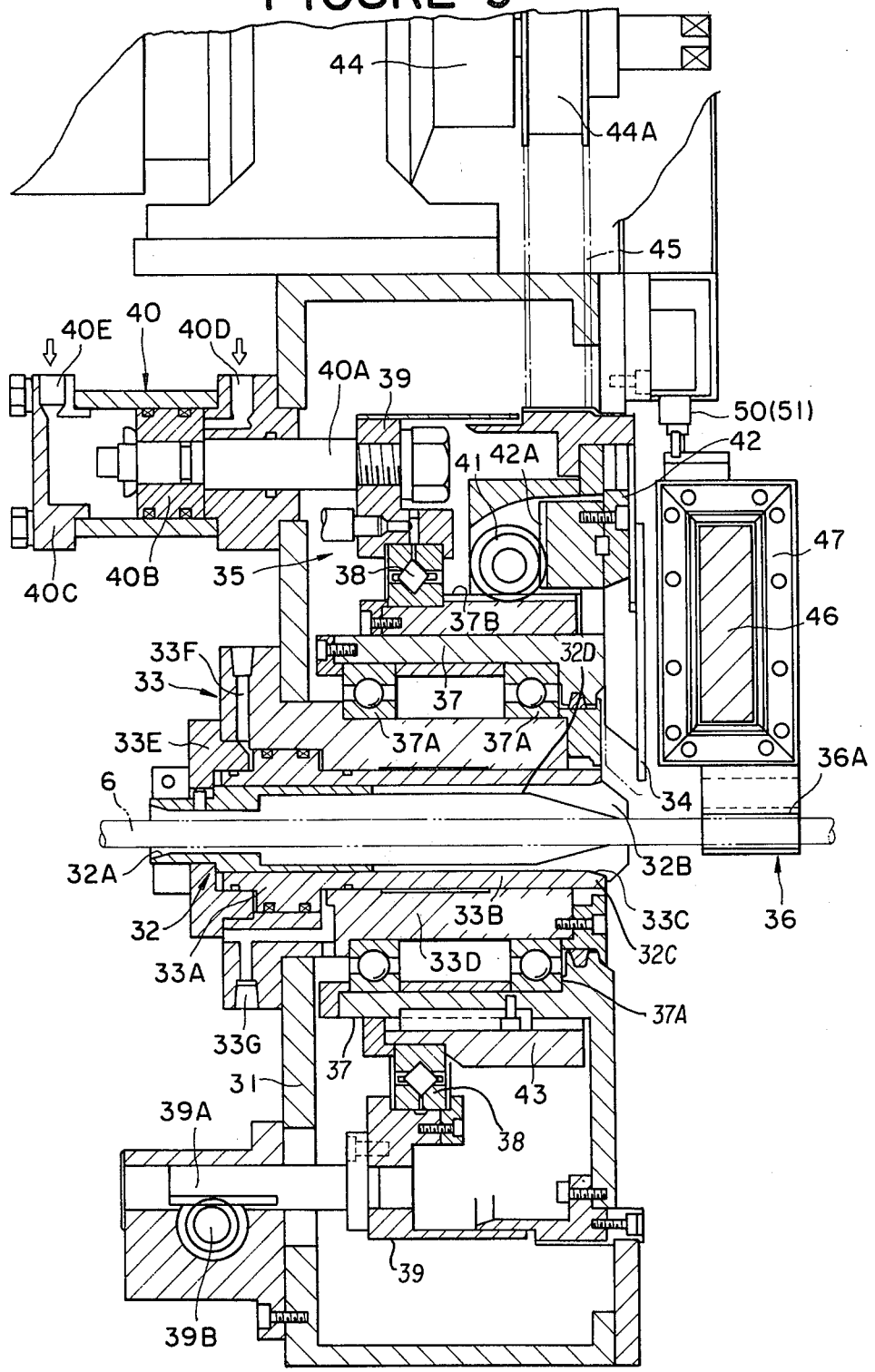
FIG. 9 is a cross-sectional view showing the interior of cutting machine.

As illustrated in detail in FIG. 9, the main chuck 32 is shaped into a cylindrical sleeve and its longitudinal axis lies on the extension of the longitudinal axis of the tubular member. Main chuck 32 has a reception opening 32A of an expanded and tapered shape and forms a chuck portion 32B by a long slit 32D extending from a longitudinally central portion of the main chuck 32 to the end opposite to the reception opening 32A. The chuck portion 32B terminates in a radially flared portion 32C.

Over the main chuck 32, is slidably fitted a cylindrical sleeve 33B having as an integral part a piston 33A. A ramp portion 33C of the cylindrical sleeve 33B engages the flared portion 32C. Furthermore, the piston 33A is fit in a cylinder 33D fixed on the housing 31 at the side where each tubular member is introduced into the cutting machine 12, thereby fixing a piston retainer 33E and forming fluid ports 33F, 33G through which fluid pressure may be supplied to either the front or rear face of the piston 33A. Thus, the construction of the chuck driving device 33 has been described.

Main chuck 32 is operated as follows. By supplying fluid pressure (oil pressure, water pressure, pneumatic pressure or the like) through the fluid port 33F and causing the piston 33A to slide rightwardly in FIG. 9, the flared portion 32C is contracted inwardly through the cylindrical sleeve 33B and the chuck portion 32B is rendered operable for holding the tubular member 6. On the other hand, when fluid pressure is applied through the fluid port 33G to slide the piston 33A leftwardly, the chuck portion 32B is rendered operable releasing the tubular member 6 by making use of the resilient recovery force of the chuck portion 32B.

Cutting tool 34 is located between the main chuck 32 and auxiliary chuck 36. It can be advanced or retracted along from the longitudinal axis of the tubular member 6, and it is rotatable around the longitudinal axis of the same tubular material. In the present embodiment, the driving device 35 for reciprocally moving and rotating the cutting tool 34 is provided in the interior of the cutting machine housing 31.

To form the driving device 35, a cylindrical housing 37 is rotatably fitted over the cylinder 33D through a pair of bearings 37A and a piston rod 40A of a cylinder device 40 for advancing or retracting the driving device 35 is coupled with an outer peripheral holder 39 of a square shaft 38 fit on the outer periphery of the cylindrical housing 37. A piston 40B of the piston rod 40A is hermetically received in a cylinder 40C fixed on the housing 31. A rack 37B is formed in the direction of the length of the tubular member at a part of the outer periphery of the cylindrical housing 37 and its corresponding pinion 41 is also kept in meshing engagement with a rack 42A formed in a holder 42 for the cutting tool 34. Holder 42 is slidably fitted in a slide groove 43A formed in an outer wheel 43 at a right angle with respect to the longitudinal axis of the tubular member 6 (see, FIG. 10). Rack 42A of holder 42 for the cutting tool 34 and the rack 37B of the cylindrical housing 37 are arranged at a right angle to each other while the pinion 41 engages both racks 37B, 42A.

Accordingly, application of fluid pressure to the piston 40B through a fluid port 40D shown in FIG. 9 causes the cylindrical housing 37 to move leftwardly in the same drawing via the square shaft 38, thereby advancing the cutting tool holder 42 toward the longitudinal axis of the tubular member 6 through the pinion 41 while being guided by the slide groove 43A. This in turn causes the cutting tool 34 detachably mounted on the cutting tool holder 42 to advance relative to the longitudinal axis of the tubular member 6. Here, the cutting edge 34A of the cutting tool 34 is allowed to advance at least a distance equivalent to the thickness of the wall of the tubular member 6.

On the other hand, application of fluid pressure to the piston 40B through a fluid pressure port 40E illustrated in FIG. 9 moves the cylindrical housing 37 rightwardly in the same drawing, contrary to what has been described above, and retracts the cutting tool 34 mounted on the cutting tool holder 42 along the longitudinal axis of the tubular member 6 by means of the rack pinion power transmission mechanism 37B, 41, 42A. In view of this reciprocal stroke, the outer peripheral holder 39 and outer wheel 43 are slidably engaged. By providing a rack 39A on the outer peripheral holder 39 and engaging the pinion 39B operated by a handle (not shown), it is possible to perform fine adjustment of the sliding movement of the cylindrical housing 37, in other words, of the reciprocal movement of the cutting tool 34.

The driving device 35 includes a mechanism for rotating the cutting tool 34 around the longitudinal axis of the tubular member 6. As illustrated in FIG. 9, the driving device 35 is constructed by mounting a drive source 44 such as a stepless motor on the top of the cutting machine housing 31 and extending a wrapping connector such as belt or chain between its pulley 44A and the outer circumference of the outer wheel 43. Thus, the outer wheel 43, which carries the cutting tool 34, is rotated around the longitudinal axis of the tubular member 6 in the direction P indicated by an arrow in FIG. 11, thereby rotating the cutting tool 34 to cut the tubular member 6 between the main chuck 32 and auxiliary chuck 36 while holding the tubular member 6 by both chucks 32, 36. At the same time, application of fluid pressure to the piston 40B through the fluid port 40D causes the cutting tool 34 to advance towards the longitudinal axis of the tubular member 6. The rotary and sliding guide portion of the outer wheel 43 is constituted by the square shaft 38 and bearings 37A so as to permit the outer wheel 43 to rotate precisely around the longitudinal axis of the tubular member 6.

With main reference to FIGS. 6, 7, 9, 11 and 12, the holding and releasing of the tubular member 6 by the auxiliary chuck 36 will be described. At a stationary side above the line of extension of the longitudinal axis of the tubular member, a slide bar 46 of a square shaft structure is disposed in a direction perpendicular to the lengthwise direction of the tubular member 6 and a pair of right and left auxiliary chuck holders 47, 47 are slidably fitted on the slide bar 46. Auxiliary chucks 36, 36 are detachably provided at lower portions of the chuck holders 47, 47, respectively. The facing surfaces of the auxiliary chucks 36, 36 constitute chuck portions 36A, 36A. When these chuck portions 36A, 36A are closed around the longitudinal axis of the tubular member, the tubular member 6 is held at four points on its outer periphery.

The auxiliary chuck holders 47, 47 have threaded cylinders 47A, 47A at their side walls, which cylinders are fitted on their corresponding threaded portions 48A, 48B of a turnbuckle shaft 48. Portions 48A, 48B are of course threaded in different directions. By rotating the shaft 48 in the normal direction or in the reverse direction by a reversible motor 49, the chuck holders 47, 47, or in other words, the auxiliary chucks 36, 36 can be advanced or retreated relative to each other. Presumming rotation of the motor 49 in the normal direction causes the auxiliary chucks 36, 36 to advance toward each other, this rotation causes the auxiliary chucks 36, 36 to hold the tubular member 6. On the other hand, reverse drive of the motor 49 allows the chucks 36, 36 to release the same tubular member 6. The selection of the direction of the motor drive and its switch-over can be carried out by switches 50, 51. The turnbuckle shaft 48 defines at its free end a tool attachment portion 48C so as to manually perform fine adjustment.

Next, reference is principally made to FIGS. 3 through 6 to describe the chamfering machine 13 which reciprocates on the table 10 relative to the end face of the tubular member cut by the aforementioned cutting tool 34 and rotates its cutting tool on the longitudinal axis of the tubular member.

A frame 52 of the chamfering machine 13 is slidably and fixably mounted on the table 10. Bearings 53 are spacedly fixed on the table 10 in the widthwise direction of the table. A manually operable bevel pinion shaft 54 is provided in the bearings 53, and a second bevel pinion shaft 55 is rotatably received in a threaded collar which is housed in the frame 52. Meshing engagement of both pinions enables the performance of fine adjustment on the chamfering machine 13 mounted on the table 10 while slidably and fixably moving the chamfering machine 13. Reference numeral 56 indicates a slide for the chamfering machine 13.

A cylinder tube 57 is continually above the frame 52 of the chamfering machine 13. A piston 58 is hermetically received in the tube 57.

Cylinder tube 57 is provided on the table 10 in a horizontal position and with its axis concentric with the longitudinal axis of the tubular member 6. Within the inner circumference of the piston 58, is press fitted a cylinder 59 which in turn is slidably fitted in the cylinder tube 57. A pair of slide guide bars 61 are provided between a platen 60 fixed at the end of the cylinder 59 and a jaw of the cylinder tube 57. One of the slide guide bars 61 is provided with a stopper 61A and the other is equipped with a sensor 61B which cooperates with a switch 62 to change the direction of the reciprocating movement.

Within the cylinder 59, is rotatably disposed a tool-driving shaft 63 with bearings 64 interposed therebetween at axial intervals. The chamfering tool 13A is detachably and follow-rotatably attached to the attachment part 65A of a tool coupler 65 provided on the head of the tool-driving shaft 63. The chamfering tool 13A is shown as a cutting tool having a cutting edge for cutting the inner peripheral edge of the end face of the tubular member and another cutting edge for cutting the outer peripheral edge of the same end face.

A motor 66 is mounted at a side of the frame 52 of the chamfering machine 13 and its pulley 66A and a pulley 63A provided with the driving shaft 63 are interlocked by a wrapping connector 67, thereby rotating the driving shaft 63, or in other words, the chamfering tool 13A around its longitudinal axis. By applying fluid pressure to either the front or rear face of the piston 58, the driving shaft 63, or in other words, the cutting tool 13A can be advanced or retracted relative to the end face of the tubular member 6.

In FIGS. 1 and 2, designated by reference numeral 68 is a nozzle for jetting out a fluid such as nitrogen therethrough. The fluid, which has been supplied under pressure to the nozzle 68, is allowed to pass in a direction through the tubular member 6 supported on the support 8 which is the third station, to thereby completely remove chips resulted from the cutting and chamfering work and to clean the inner wall of the tubular member 6.

Figure 12:
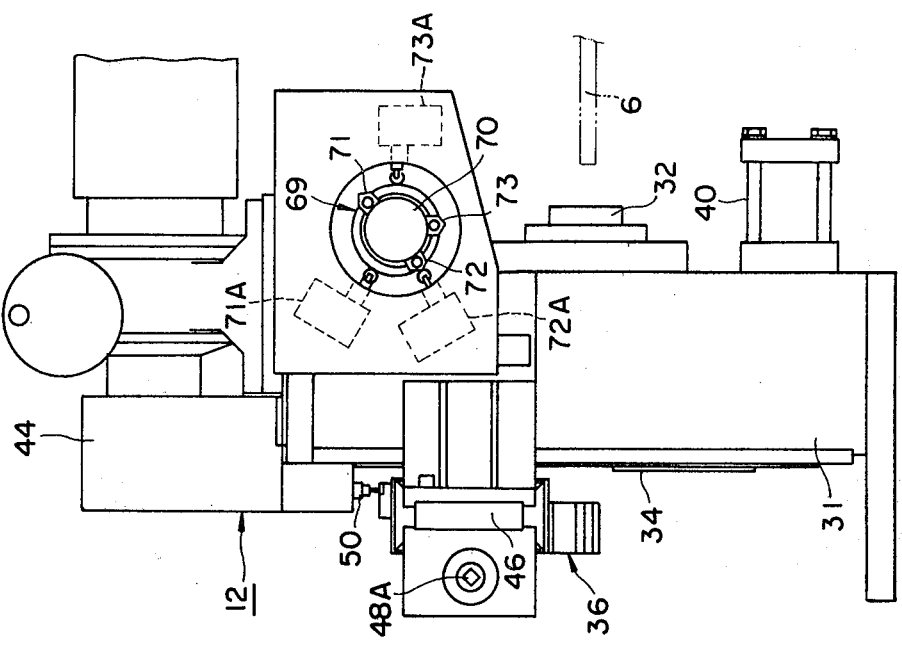
FIG. 12 is a side elevational view of the cutting machine.
Figure 10:
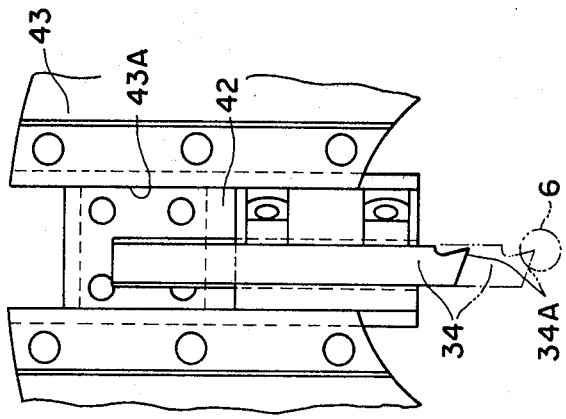
FIG. 10 is a frontal view of the cutting tool of the cutting machine.

In FIG. 12, reference numeral 69 indicates a rotary switch-over device. A plurality of switch actuators 71, 72, 73 are provided on its rotary shaft 70 along the periphery thereof with a different interval and their corresponding switches 71A, 72A, 73A are also provided to detect the actuators.

Now, the operation of the above-described apparatus will be described hereinafter, including the holding of a plurality of tubular members 6, which have been processed through the necessary steps such as pickling and rinsing and placed side by side on the feed-in table 3, one after the other in the horizontal position on the cutting and chamfering table 4, cutting the same into a predetermined length and chamfering, and ejecting them onto the discharge-side table 5.

First of all, at the beginning of the cutting and chamfering work, the table 10 is moved, in the illustrated embodiment, inwardly through the contraction of the cylinder device 17 by a predetermined distance to make the table 10 fit the length of the tubular member 6 held on the support 7 and the end portion of the tubular member 6 is supported through cooperation of the main chuck 32 and auxiliary chuck 36. Here, the tubular member 6 has a mirror-finished surface and of high quality. However, in some instances, the tubular member 6 may contain localized defects. In this case, if such a localized defect is found at a place somewhat closer to either one of the opposite ends of the tubular member 6, the corresponding table 10 can be moved to remove a tube section containing the defect insofar as the pair of right and left tables 10, 10 can be independently reciprocated. Thus, the tube section to be cut off can be minimized in length, thereby improving the production yield.

When advancing both tables 10, 10 simultaneously, the main chucks 32 and auxiliary chucks 36 are each kept in an open position and opposite end portions of the tubular member 6 held by the support 7 can be passed through their respective chucks 32, 36. The length of the final tubular member can be controlled by governing the contracted position of the cylinder device 17 with the switch 26.

After extending the tubular member 6 through each main chuck 32 and auxiliary chuck 36, both in open position, the main chuck 32 is actuated by the driving device 33 to assume a holding position while the auxiliary chuck 36 is brought into a holding position by advancing the chuck holders 47, 47 toward each other through a rotation of the turnbuckle shaft 47 by the motor 49, thus firmly holding the tubular member 6 at both ends thereof by means of both of the main and auxiliary chucks 32, 36.

While maintaining this holding position, the piston 40B is moved leftward to advance the cutting tool holder 42 through the rack and pinion power transmission mechanism 37B, 41, 42A and the outer wheel 43 is rotated through actuation of the power source 44, thereby cutting the tubular member 6 around its outer periphery by means of the cutting edge 34A of the cutting tool 34. During this cutting operation, the cutting tool 34 advances between the main chuck 32 and auxiliary chuck 36 and is there rotated. Thus, the resistance to be encountered during the cutting work is rendered extremely small such that accurate and fast cutting work is assured.

After completion of such cutting work, the main chuck 32 and auxiliary chuck 36 are temporarily released from their holding positions and the cutting tool 34 retreats and terminates its rotation. Once the chucks 32 and 36 are released, the cut-out tube end portion automatically drops into a shute (not shown) which drops the waste to a waste box. Then the main chuck 32 and auxiliary chuck 36 are again caused to hold the tubular member 6 on the support 7, and an advancing fluid pressure is applied to the piston 58 of the chamfering machine 13 to let the chamfering tool 13A approach the thus-cut end face of the tubular member held by both chucks 32, 36, thereby taper chamfering the inner and outer peripheral edges of the cut end face with the cutting edges of the tool 13A. Since the tubular member 6 is firmly supported at opposite end portions thereof by their respective chucks 32, 36 during this chamfering operation, accurate and fast chamfering work is assured.

Subsequent to completion of such chamfering work, the chamfering machine 13 is independently retracted and its rotation is stopped, thus returning to its normal position. Thereafter, the chucks 32, 36 are opened and the cutting machine 12 is returned to its original position through an expansion of the cylinder device 17. Then, the tubular member (i.e., final product) on the support 7 is loaded onto another support 8 through its parallel movement, where a pressurized medium (nitrogen) is jetted out in one direction from the fluid nozzle 68 into the tubular member 6 held on the support 8 to blow away chips or the like. After completion of all the above steps, the product is transferred onto the discharge-side table 5.

As the cutting machine 12 and chamfering machine 13 are mounted side by side on each of the tables 10, 10 disposed at opposite ends of the support 7, it is possible to achieve the principal merit that the tubular member 6 on the support 7 can be cut and chamfered simultaneously at opposite end portions of the member 6. Moreover, since the tables 10, 10 are displaceable back and forth relative to each other, the apparatus can be applied for the cutting and chamfering work of tubular members of different lengths. Since the tables 10, 10 can also be moved independently toward or away from each other, it is possible to minimize the length of an end section to be cut off, resulting in an improvement in the production yield of tubular members.

Upon cutting, the cutting tool 34 is advanced between the main chuck 32 and auxiliary chuck 36. This reduces the cutting resistance to be encountered. Since the cutting tool 34 is rotated around the longitudinal axis of the tubular member 6, fast and precise cutting work can be performed while maintaining the right angle of the cut end face in association with the support by the chucks 32, 36. This chuck function is also effectively utilized during the chamfering work by the chamfering machine 13. Thus, accurate and fast chamfering work is assured. In addition, the chamfering machine 13 moves back and forth on the table 10, its work stroke can be kept short, also contributing to improvement of the chamfering accuracy, etc.

Where the fluid nozzle 68 is provided, fluid can be jetted out in one direction into the tubular member 6 held on the support 8 at the discharge-side table 5. This brings about another advantage in that any foreign member in the tubular material 6 can be perfectly removed.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A cutting and chamfering apparatus for both cutting and chamfering opposing ends of elongate members, said apparatus comprising:
    (a) a plurality of first supports (7) located at axially spaced intervals for supporting an elongate member (6) in a horizontal position;
    (b) first and second tables (10) provided respectively at axially opposite sides of said plurality of first supports (7);
    (c) first means (11) for displacing said first and second tables (10) back and forth relative to each other independently or simultaneously in the direction of the horizontal axis of the elongate member (6);
    (d) a first chuck (32) mounted on each of said first and second tables (10) for releasably holding the elongate member (6);
    (e) a second chuck (36) mounted on each of said first and second tables (10) axially inwardly of said first chucks (32) for releasably holding the elongate member (6);
    (f) a cutting tool (34) mounted on each of said first and second tables (10) between said first and second chucks (32 and 36);
    (g) second means (37B, 41) for displacing each of said cutting tools (34) back and forth in the direction of the longitudinal axis of the elongate member (6);
    (h) third means (41, 42A) for displacing each of said cutting tools (34) radially inwardly and outwardly, toward and away from the longitudinal axis of the elongate member (6);
    (i) fourth means (43, 44A) for rotating each of said cutting tools (34) around the longitudinal axis of the elongate member (6);
    (j) a chamfering tool (13A) mounted on each of said first and second tables (10) independently of said cutting tools (34);
    (k) fifth means (57, 58, 59) for displacing each of said chamfering tools (13A) back and fourth in the direction of and along the longitudinal axis of the elongate member (6) independently of movement of said cutting tools (34); and
    (l) sixth means (59, 63) for rotating said chamfering tools (13A) around the longitudinal axis of the elongate member (6) independently of rotation of said cutting tools (34).

2. A cutting and chamfering apparatus as recited in claim 1 wherein said second means (37B, 41) comprises a rack (37B) and a pinion (41).

3. A cutting and chamfering apparatus as recited in claim 1 wherein said first means (11) comprise:
    (a) seventh means (16) for displacing said first and second tables (10) so as to fit the apparatus to the length of the elongate member (6) and
    (b) eighth means (17) for setting the cutting and chamfering length of the elongate member (6).

4. A cutting and chamfering apparatus as recited in claim 3 wherein:
    (a) each of said first means (11) further comprises a support frame (9);
    (b) said seventh means (16) comprises a hydraulic motor (14) and a screw shaft (15) operatively connected to said support; and
    (c) said eighth means (17) comprises a hydraulic cylinder (17A) and a piston rod (17B) which are operatively connected to said support frame (9).

5. A cutting and chamfering apparatus as recited in claim 1 wherein each of said first chucks (32) comprises:
    (a) a first cylindrical sleeve (32B) which has a tapered reception opening (32A) formed therein at the axially outward end thereof, a radially flared portion (32C) formed therein at the axially inward end thereof, and a long axial slit (32D) which extends from one end thereof and (b) a second cylindrical sleeve (33B) slidably fit over said first cylindrical sleeve (32B), said second cylindrical sleeve (33B) having a piston (33A) as an integral part thereof and a ramp portion (33C) which abuts against said radially flared portion (32C) of said first cylindrical sleeve (32B), whereby:

(c) when said piston (33A) is moved so as to cause said ramp portion (33C) to slide up over said radially flared portion (32C), said first cylindrical sleeve (32B) is compressed radially inwardly to hold the elongate member (6) and (d) when said piston (33A) is moved so as to cause said ramp portion (33C) to slide back down off said radially flared portion (32C), said first cylindrical sleeve (32B) expands radially outwardly to release the elongate member (6).

6. A cutting and chamfering apparatus as recited in claim 1 wherein each of said second chucks (36) comprises:

(a) a stationary slide bar (46) mounted on one of said first and second tables (10) perpendicularly to the longitudinal axis of the elongate member (6);

(b) a pair of chuck holders (47) slidably mounted on said stationary slide bar (46); and (c) a pair of half chuck portions (36A) mounted on each of said pair of chuck holders (47) in position to engage the elongate member (6).

7. A cutting and chamfering apparatus as recited in claim 6 wherein:

(a) each of said second chucks (36) further comprises a turnbuckle shaft (48) having first and second portions (48A, 48B) which are threaded in opposite direction and (b) each of said chuck holders (47) is internally threaded and is fitted on one of said first and second portions (48A, 48B) of said turnbuckle shaft (48), whereby:

(c) rotation of said turnbuckle shaft (48) causes mutually opposing displacement of said chuck holders (47) and, thereby, said pairs of half chuck portions (36A).

8. A cutting and chamfering apparatus as recited in claim 1 wherein each of said fifth means (57, 58, 59) comprises:

(a) a cylinder tube (57) mounted on one of said first and second tables (10) in a horizontal position and with it axis coincident with the longitudinal axis of the elongate member (6);

(b) a piston (58) hermetically received in said cylinder tube (57); and (c) a cylinder (59) slidably disposed in said cylinder tube (57), said cylinder (59) being operatively connected to said piston (58) and said chamfering tool (13A).

9. A cutting and chamfering apparatus as recited in claim 1 wherein each of said sixth means (59, 63) comprises:

(a) a cylinder (59) mounted on one of said first and second tables (10) is a horizontal position and with it axis coincident with the longitudinal axis of the elongate member (6) and (b) a tool-driving shaft (63) rotatably disposed in said cylinder (59), said chamfering tool (13A) being operatively connected to said tool-driving shaft (63).

10. A cutting and chamfering apparatus as recited in claim 1 wherein said apparatus is designed to both cut and chamfer opposing ends of elongate tubular members in that each of said chamfering tools (13A) has a first cutting edge for cutting the inner peripheral edge of the elongate tubular member (6) and a second cutting edge for cutting the outer peripheral edge of the elongate tubular member (6).

11. A cutting and chamfering apparatus as recited in claim 1 wherein said apparatus is designed to both cut and chamfer opposing ends of elongate tubular members and further comprising:

(a) a plurality of second supports (8) located at axially spaced intervals to one side of said first supports (7) for supporting an elongate tubular member (6) in a horizontal position and (b) a fluid nozzle (68) provided near one end of the elongate tubular member (6) supported on said second supports (8) for jetting out a fluid into and through the elongate tubular member 6 so as to remove any chips from the inner surface of the elongate tubular member (6).

12. A cutting and chamfering apparatus as recited in claim 11 wherein said fluid nozzle (68) is mounted on one of said first and second tables (10).

* * * * *